(12) United States Patent
Singh et al.

(10) Patent No.: US 10,143,212 B2
(45) Date of Patent: Dec. 4, 2018

(54) LIPID ENCAPSULATION

(75) Inventors: Harjinder Singh, Palmerston North (NZ); Xiang-Qian Zhu, Palmerston North (NZ); Aiqian Ye, Palmerston North (NZ)

(73) Assignee: MASSEY UNIVERSITY, Palmerston North (NZ)

( * ) Notice: Subject to any disclaimer, the term of this patent is extended or adjusted under 35 U.S.C. 154(b) by 706 days.

(21) Appl. No.: 11/912,639

(22) PCT Filed: Apr. 26, 2006

(86) PCT No.: PCT/NZ2006/000083
§ 371 (c)(1),
(2), (4) Date: May 20, 2008

(87) PCT Pub. No.: WO2006/115420
PCT Pub. Date: Nov. 2, 2006

(65) Prior Publication Data
US 2009/0029017 A1    Jan. 29, 2009

(30) Foreign Application Priority Data
Apr. 26, 2005 (NZ) ........................... 539628

(51) Int. Cl.
*A23C 9/13* (2006.01)
*A23D 7/06* (2006.01)
*A23J 3/08* (2006.01)
*A23J 3/10* (2006.01)
*A23D 7/005* (2006.01)

(52) U.S. Cl.
CPC .......... *A23C 9/1315* (2013.01); *A23D 7/0053* (2013.01); *A23D 7/06* (2013.01); *A23J 3/08* (2013.01); *A23J 3/10* (2013.01); *A23V 2002/00* (2013.01)

(58) Field of Classification Search
CPC ...... A23C 9/1315; A23D 7/0053; A23D 7/06; A23J 3/08; A23J 3/10; A23V 2250/18; A23V 2250/54246; A23V 2250/54252; A23V 2002/00; A23V 2200/224; A23V 2250/187; A23V 2250/1868
See application file for complete search history.

(56) References Cited

U.S. PATENT DOCUMENTS 2,282,790 A * 5/1942 Musher .......................... 554/2
4,168,322 A * 9/1979 Buckley et al. ............... 426/250
4,376,072 A * 3/1983 Connolly ...................... 530/420
(Continued)

FOREIGN PATENT DOCUMENTS

GB    1 236 885    6/1971
JP    60102168     6/1985
(Continued)

OTHER PUBLICATIONS

Kaitaranta, JK Control of Lipid Oxidation in Fish Oil with Various Antioxidative Compounds JAOCS, 1992, 69(8):810.*
(Continued)

*Primary Examiner* — Subbalakshmi Prakash
(74) *Attorney, Agent, or Firm* — Merchant & Gould P.C.

(57) ABSTRACT

The invention relates to an emulsion for protecting oxidizable lipids from oxidative damage and methods of making the same. The lipids are encapsulated in a complex of casein and whey protein.

32 Claims, 11 Drawing Sheets

(56) References Cited

U.S. PATENT DOCUMENTS

| | | | |
|---|---|---|---|
| 4,519,945 A * | 5/1985 | Ottenhof | 530/361 |
| 4,895,725 A | 1/1990 | Kantor et al. | |
| 6,168,819 B1 * | 1/2001 | Zeller et al. | 426/569 |
| 6,444,242 B1 | 9/2002 | Skelbaek et al. | |
| 2003/0185960 A1 | 10/2003 | Augustin et al. | |
| 2003/0203005 A1 | 10/2003 | Small et al. | |
| 2004/0017017 A1 * | 1/2004 | Van Lengerich et al. | 264/4 |
| 2004/0191390 A1 | 9/2004 | Lee | |
| 2005/0233002 A1 | 10/2005 | Trubiano et al. | |

FOREIGN PATENT DOCUMENTS

| | | |
|---|---|---|
| JP | 9-121766 | 5/1997 |
| JP | 10-4918 | 1/1998 |
| JP | 2001-292695 A * | 10/2001 |
| JP | 2001292695 | 10/2001 |
| WO | WO 94/01001 | 1/1994 |
| WO | WO 96/19114 | 6/1996 |
| WO | WO 01/80656 A1 | 11/2001 |
| WO | WO 2004/009054 | 1/2004 |
| WO | WO 2004/020977 | 3/2004 |
| WO | WO 2004/026950 | 4/2004 |
| WO | WO 2005/013708 | 2/2005 |

OTHER PUBLICATIONS

Henry, G., Mollé, D., Morgan, F, Fauquant, J and Bouhallab, S. Heat-induced covalent complex between casein micelles and beta-lactoglobulin from goat's milk: identification of an involved disulfide bond.. J Agric Food Chem, 2002, 50(1):185-91.*
Zittle,. C.A, Thompson, M.P, Custer J.H, and J. Cerbulis, κ-casein-β-lactoglobulin interaction in solution when heated, J. Dairy Sci. 1962, 45 p. 807.*
Laurence Donato, Fanny Guyomarc Formation and properties of the whey protein/κ-casein complexes in heated skim milk—A review Dairy Sci. Technol. 89 (2009) 3-29.*
Britt'en, M and Giroux, HJ Emulsifying Properties of Whey Protein and Casein Composite Blends 1991 J Dairy Sci 74 : 3318-3325.*
Grufferty M et al. Journal of the Socieiy of Dairy Technology, Yo1 44. No. 1. Feb. 1991.*
Bohoua Guichard et al Effect of the relative proportion of kappa-casein to beta-lactoglobulin on food functionality of their complex [hydrophobic interaction, protein peptide interaction] [1997] (translated abstract) http://agris.fao.org/agris-search/search.do?recordID=FR1998001716.*
Simopoulous et al. "Essential fatty acids in health and chronic disease." Am J. An. Nurtr. vol. 70. 1999. pp. 560-569.
Faraji et al. "Role of Continuous Phase Protein on the Oxidative Stability of Fish Oil-in-Water Emulsions." J. Agric. Food. Chem. vol. 52. 2004. pp. 4558-4564.
Hu et al. "Lipid Oxidation in Corn Oil-in-Water Emulsions Stabilized by Casein, Whey Protein isolate, and Soy Protein Isolate." J. Agric. Food. Chem. vol. 51. 2003. pp. 1696-1700.
Hu et al. "Impact of Whey Protein Emulsifiers on the Oxidative Stability of Salmon Oil-in-Water Emulsions." J. Agric. Food Chem. vol. 51. 2003. pp. 1435-1439.
McClements et al. "Lipid Oxidation in Oil-in-Water Emulsions: Impact of Molecular Environment on Chemical Reactions in Heterogeneous Food Systems." Journal of Food Science. vol. 65. No. 8. 2000. pp. 1270-1282.
Singh et al. "Reconstitution Behaviour of Spray-Dried Infant formula as affected by the type of milk proteins employed for encapsulation of fat." Indian J. Dairy Sci. vol. 5. No. 5. 1992. pp. 251-255.
Veith, P.D. & Reynolds, E.C., (1987) *Production of a High Gel Strength Whey Protein Concentrate From Cheese Whey*, J. Dairy Sci. 2004, PubMed-NCBI.
Communication from European Patent Office for EP Patent No. 1 876 905 with letter from Opponent noting art (Apr. 18, 2013), 2 pages.
Notice of Opposition and Written Opposition for EP Patent No. 1 876 905 dated Mar. 13, 2013, 4 pages.
Notice of Preliminary Rejection from Korean Patent Application No. 7027077/2007 dated Oct. 16, 2012, 9 pages.
Römp, Lexikon der Chemie, $10^{th}$ edition, 1997, Georg Thime Verlag "Fischöle" [Fish Oils], p. 1346.
Römp, Lexikon der Chemie; $10^{th}$ edition, 1997, Georg Thime Verlag "Komplexe" [Complexes], p. 2220.
Sourdet et al. "Composition of fat protein layer in complex food emulsions at various weight ratios of casein-to-whey proteins." Lait. vol. 82. 2002. pp. 567-578.
Written Opposition for EP Patent No. 1 876 905.
Office Action, Korean Patent Application 2007-7027077, dated Aug. 27, 2013, 3 pages.
Beaulieu et al., Food Chemistry and Toxicology, 1999, vol. 64, No. 5, pp. 776-780.
Notice of Grant for corresponding application South Korea Application No. 2007-7027077. dated Jun. 25, 2014 (3 pages).

* cited by examiner

LIPID ENCAPSULATION

FIELD OF THE INVENTION

This invention relates to protection of oxidisable lipids and in particular, an emulsion that protects oxidisable lipids from oxidative damage by encapsulating the lipids in a protein complex. The invention also provides a method of preparing the emulsion, and foods and cosmetics containing the emulsion.

BACKGROUND OF THE INVENTION

It has recently been recognised that long chain polyunsaturated fatty acids provide extensive nutritional and health benefits in human health (Uauy-Dagach, R. and Valenzuela, A. Nutrition Reviews 1996; 54, 102-108; Ruxton, C. H. S., Reed, S. C., Simpson, J. A. and Millington, K. J. 2004; J. Human Nutr. Dietet. 17, 449-459).

For example, omega-3 fatty acids have been documented as contributing to the prevention of coronary heart disease, hypertension, type 2 diabetes, rheumatoid arthritis, Crohn's disease and obstructive pulmonary disease (Simopoulos A P, Am J Clin Nutr, 1999; 70:560-569).

Recognition of the potential benefits of these lipids has stimulated interest in foods and nutraceuticals that contain them. However, including lipids such as omega-3 fatty acids into food products gives rise to major formulation challenges. Many lipids are sensitive to heat, light and oxygen and undergo oxidative damage very quickly. Fatty acid oxidation is a major cause of food deterioration which can affect the flavour, aroma, texture, shelf life and colour of food.

Besides producing undesirable characteristics in the food such as off-flavour, oxidative damage can eliminate the beneficial biological activity of an oxidisable lipid. There is also a potential for health damage by increasing free radical formation in the body. Accordingly, if oxidisable lipids such as omega-3 fatty acids are to be successfully incorporated into food products, these negative characteristics must be avoided.

One way of reducing oxidative damage is to encapsulate the oxidisable lipid so as to reduce its contact with oxygen, trace metals and other substances that attack the double bonds and other susceptible locations of the oxidisable lipid. To this end, oxidisable lipids have been combined with a number of other substances including other oils, polysaccharides and proteins.

Many existing encapsulation systems for fatty acids and other lipids use polysaccharides and gelatine to form microcapsules; see for example, British patent GB 1,236,885. Because of their relatively large size, these microcapsules can sediment in low-viscosity products and hence are unsuitable for application in beverages, particularly long shelf-life, heat-treated food products.

In U.S. Pat. No. 4,895,725 microcapsules of fish oil are produced by encapsulating the oil within a non-oil soluble enteric coating. Although palatable, the resulting capsules are not heat stable and are unstable at a pH higher than 7. This greatly limits their application in a wide range of food products.

Proteins have also been used to encapsulate oxidisable lipids and have been partially successful in reducing the odour of strong smelling lipids. For example; Patent Application JP 60-102168 describes a fish oil emulsion incorporating hydrophilic proteins that is able to suppress the fishy smell. However, the composition is vulnerable to oxidation and must still contain an antioxidant. Oxidation mechanisms in complex food systems are different from those in bulk oils. Compounds that are efficient antioxidants in a bulk oil may have pro-oxidant activity in complex food systems. It may therefore be desirable to avoid incorporation of antioxidant compounds if possible. Proteins are also generally unstable when heated so protein-based emulsions may be unsuitable for many food applications.

PCT publication WO 01/80656 describes a composition that comprises a milk or aqueous portion, a protecting oil such as oat oil or oat bran oil and polyunsaturated lipid stabilised with soy protein. The emulsion is reported to demonstrate a lower oxidation rate than an unstabilised emulsion because of the antioxidant properties of the protecting oil.

PCT publication WO 96/19114 describes a water-in-oil emulsion containing a fish oil. The fat phase of the emulsion comprises unhydrogenated fish oil and an antioxidant. The aqueous phase must not contain any ingredient that can react or catalyse a reaction with the components of the fat phase. The specification reports that milk proteins contain ingredients which may react with or act as catalysts for a reaction with the fish oil and/or antioxidant causing a metallic off-flavour or fishy taste. It is therefore suggested that the use of these proteins in the emulsion is to be avoided.

Milk proteins have, however, been used in combination with carbohydrates to encapsulate oxygen-sensitive oils in US Patent Application 20030185960. The specification describes heating a milk protein such as casein, soy or whey with a carbohydrate containing a reducing group. The resulting Maillard reaction products are mixed with the oil and homogenised. Unfortunately, Maillard reaction products are considered to have a negative effect on human health. In addition, the high sugar content of the resulting emulsion precludes its use in low calorie and/or low carbohydrate savory products.

Consequently, it is an object of the invention to provide an improved or alternative emulsion for encapsulating at least one oxidisable lipid that alleviates at least some of the disadvantages discussed above, or at least provides the public with a useful choice.

SUMMARY OF THE INVENTION

In a first aspect the invention broadly comprises an emulsion comprising at least one oxidisable lipid encapsulated in a complex of casein and whey protein.

In one embodiment, the emulsion comprises about 0.5 to about 60 wt % of at least one oxidisable lipid. Preferably, the emulsion comprises about 1 to about 50 wt % of at least one oxidisable lipid, more preferably about 10 to about 40 wt %. In a preferred embodiment the emulsion comprises about 20 to about 30 wt % of at least one oxidisable lipid.

In another embodiment the oxidisable lipid is an edible lipid such as a polyunsaturated fatty acid or ester thereof. Preferably, the oxidisable lipid is a highly unsaturated fatty acid or ester thereof. More preferably, the oxidisable lipid is fish oil or is derived from fish oil. Most preferably, the oxidisable lipid is an omega-3 fatty acid, such as eicosapentaenoic acid (EPA) or docosahexaenoic acid (DHA).

In another embodiment the emulsion comprises at least about 0.25 wt % casein. Preferably, the emulsion comprises about 0.25 to about 5 wt % casein. More preferably, the emulsion comprises about 1 to about 4 wt % casein, most preferably, about 2 to about 3 wt % casein.

In another embodiment the emulsion comprises at least about 0.25 wt % whey protein. Preferably, the emulsion comprises about 0.25 to about 5 wt % whey protein. More preferably, the emulsion comprises about 1 to about 4 wt % whey protein, most preferably, about 2 to about 3 wt % whey protein.

In another embodiment the weight ratio of casein to whey protein in the emulsion is about 10:1 to about 1:10. Preferably, the ratio of casein to whey protein is about 5:1 to about 1:5, more preferably about 2:1 to about 1:2 and most preferably 1:1.

Preferably, the casein is sodium caseinate.

Preferably, the whey protein is whey protein isolate (WPI).

In another embodiment the complex is formed by heating a mixture of casein and whey protein solutions at about 70° C. to about 100° C., more preferably at about 80° C. to about 95° C., and most preferably, at about 90° C. Preferably, heating is for about 1 to about 30 minutes. More preferably, heating is for about 5 to about 20 minutes. Most preferably, heating is for about 5 minutes.

Preferably, the aqueous solution of casein and whey protein is pH adjusted to about 6 to about 9 before heating. More preferably, the aqueous solution of casein and whey protein is pH adjusted to about 6.5 to about 8 before heating, even more preferably, to about 7.5 to about 8.0.

In a preferred embodiment the emulsion comprises about 2 wt % casein and about 2 wt % whey protein.

Optionally, the emulsion can be deodorised. In one embodiment the emulsion can be deodorised by bubbling nitrogen through it at reduced pressure.

Optionally, the emulsion can be dried to form a powder. In one embodiment the emulsion can be dried by spray-drying.

Optionally, the emulsion can be heat treated or sterilised. In one embodiment the emulsion is sterilised by ultra-high temperature (UHT) (e.g. 140° C. for 5 seconds). In another embodiment the emulsion is pasteurised (e.g. 72° C. for 15 seconds). In another embodiment the emulsion is retorted (e.g. heated in a sealed container at 120° C. for 20 minutes).

In a second aspect the invention broadly comprises a method of making an emulsion comprising at least one oxidisable lipid encapsulated by a complex of casein and whey protein, the method comprising:
 (a) forming a complex of casein and whey protein in aqueous solution wherein the casein and whey protein are linked by disulfide bonds,
 (b) dispersing the at least one oxidisable lipid in the aqueous solution, and
 (c) homogenising the mixture formed in step (b).

In one embodiment, the emulsion comprises about 0.5 to about 60 wt % of at least one oxidisable lipid. Preferably, the emulsion comprises about 1 to about 50 wt % of at least one oxidisable lipid, more preferably about 10 to about 40 wt %. In a preferred embodiment the emulsion comprises about 20 to about 30 wt % of at least one oxidisable lipid.

In another embodiment the oxidisable lipid is an edible lipid such as a polyunsaturated fatty acid or ester thereof. Preferably, the oxidisable lipid is a highly unsaturated fatty acid or ester thereof. More preferably, the oxidisable lipid is fish oil or is derived from fish oil. Most preferably, the oxidisable lipid is an omega-3 fatty acid, such as EPA or DHA.

In another embodiment the emulsion comprises at least about 0.25 wt % casein, preferably about 0.25 to about 5 wt % casein. More preferably, the emulsion comprises about 1 to about 4 wt % casein, most preferably, about 2 to about 3 wt % casein.

In another embodiment the emulsion comprises at least about 0.25 wt % whey protein, preferably about 0.25 to about 5 wt % whey protein. More preferably, the emulsion comprises about 1 to about 4 wt % whey protein, most preferably, about 2 to about 3 wt % whey protein.

In another embodiment of the emulsion the weight ratio of casein to whey protein is about 10:1 to about 1:10. Preferably, the ratio of casein to whey protein is about 5:1 to about 1:5, more preferably about 2:1 to about 1:2 and most preferably 1:1.

Preferably, the casein is sodium caseinate.

Preferably, the whey protein is whey protein isolate (WPI).

In another embodiment the complex is formed by heating a mixture of casein and whey protein solutions at about 70° C. to about 100° C., more preferably at about 80° C. to about 95° C., and most preferably, at about 90° C. Preferably, heating is for about 1 to about 30 minutes. More preferably, heating is for about 5 to about 20 minutes. Most preferably, heating is for about 5 minutes.

Preferably, the aqueous solution of casein and whey protein is pH adjusted to about 6 to about 9 before heating. More preferably, the aqueous solution of casein and whey protein is pH adjusted to about 6.5 to about 8 before heating, even more preferably, to about 7.5 to about 8.0.

Optionally, the method includes a further step of deodorisation. In one embodiment the emulsion can be deodorised by bubbling nitrogen through it at reduced pressure.

Optionally, the method includes a further step of drying the emulsion. In one embodiment the emulsion can be dried by spray-drying.

Optionally, the method includes a further step of heat treating or sterilisation. In one embodiment the emulsion is sterilised by ultra-high temperature (UHT) (e.g. 140° C. for 5 seconds). In another embodiment the emulsion is pasteurised (e.g. 72° C. for 15 seconds). In another embodiment the emulsion is retorted (e.g. heated in a sealed container at 120° C. for 20 minutes).

In a third aspect the invention broadly comprises a method of making an emulsion comprising at least one oxidisable lipid encapsulated by a complex of casein and whey protein, the method comprising:
 (a) heating an aqueous solution of casein and whey protein to form a protein complex,
 (b) dispersing the at least one oxidisable lipid in the aqueous solution, and
 (c) homogenising the mixture formed in step (b).

In one embodiment, the emulsion comprises about 0.5 to about 60 wt % of at least one oxidisable lipid. Preferably, the emulsion comprises about 1 to about 50 wt % of at least one oxidisable lipid, more preferably about 10 to about 40 wt %. In a preferred embodiment the emulsion comprises about 20 to about 30 wt % of at least one oxidisable lipid.

In another embodiment the oxidisable lipid is an edible lipid such as a polyunsaturated fatty acid or ester thereof. Preferably, the oxidisable lipid is a highly unsaturated fatty acid or ester thereof. More preferably, the oxidisable lipid is fish oil or is derived from fish oil. Most preferably, the oxidisable lipid is an omega-3 fatty acid, such as EPA or DHA.

In another embodiment the emulsion comprises at least about 0.25 wt % casein, preferably about 0.25 to about 5 wt % casein. More preferably, the emulsion comprises about 1 to about 4 wt % casein, most preferably, about 2 to about 3 wt % casein.

In another embodiment the emulsion comprises at least about 0.25 wt % whey protein, preferably about 0.25 to about 5 wt % whey protein. More preferably, the emulsion comprises about 1 to about 4 wt % whey protein, most preferably, about 2 to about 3 wt % whey protein.

In another embodiment of the emulsion the weight ratio of casein to whey protein is about 10:1 to about 1:10. Preferably, the ratio of casein to whey protein is about 5:1 to about 1:5, more preferably about 2:1 to about 1:2 and most preferably 1:1.

In another embodiment the casein is sodium caseinate.

In another embodiment the whey protein is whey protein isolate (WPI).

In another embodiment the aqueous solution of casein and whey protein is heated at about 70° C. to about 100° C., more preferably at about 80° C. to about 95° C., and most preferably, at about 90° C. Preferably, heating is for about 1 to about 30 minutes. More preferably, heating is for about 5 to about 20 minutes. Most preferably, heating is for about 5 minutes.

Preferably, the aqueous solution of casein and whey protein is pH adjusted to about 6 to about 9 before heating. More preferably, the aqueous solution of casein and whey protein is pH adjusted to about 6.5 to about 8 before heating, even more preferably, to about 7.5 to about 8.0.

Optionally, the method includes a further step of deodorisation. In one embodiment the emulsion can be deodorised by bubbling nitrogen through it at reduced pressure.

Optionally, the method includes a further step of drying the emulsion. In one embodiment the emulsion can be dried by spray-drying.

Optionally, the method includes a further step of heat treating or sterilisation. In one embodiment the emulsion is sterilised by ultra-high temperature (UHT) (e.g. 140° C. for 5 seconds). In another embodiment the emulsion is pasteurised (e.g. 72° C. for 15 seconds). In another embodiment the emulsion is retorted (e.g. heated in a sealed container at 120° C. for 20 minutes).

Further aspects of the invention provide a powder obtained by drying the emulsion of the invention and food and cosmetic products incorporating the emulsion or powder of the invention of combinations of both.

In one embodiment the invention provides a food such as a dip, condiment, sauce or paste comprising the emulsion or powder of the invention.

In another embodiment the invention provides a cosmetic such as a moisturiser skin cream, hand cream, face-cream or massage cream comprising the emulsion or powder of the invention

BRIEF DESCRIPTION OF THE DRAWINGS

The invention will now be described with reference to the drawings in which:

FIG. 4 is two graphs showing the lipid oxidation rates of preferred emulsions of the invention prepared using protein solutions of varying concentration.

FIG. 6 is two graphs showing the lipid oxidation rates of preferred emulsions of the invention prepared under different pH conditions.

FIG. 7 is two graphs showing the lipid oxidation rates of preferred emulsions of the invention prepared under different pH conditions (measured determining the formation of propanal).

FIG. 7A shows the lipid oxidation rates of freshly prepared emulsions while

FIG. 8 is two graphs showing the lipid oxidation rates of preferred emulsions prepared under different conditions of temperature.

DETAILED DESCRIPTION OF THE INVENTION

Figure 1:
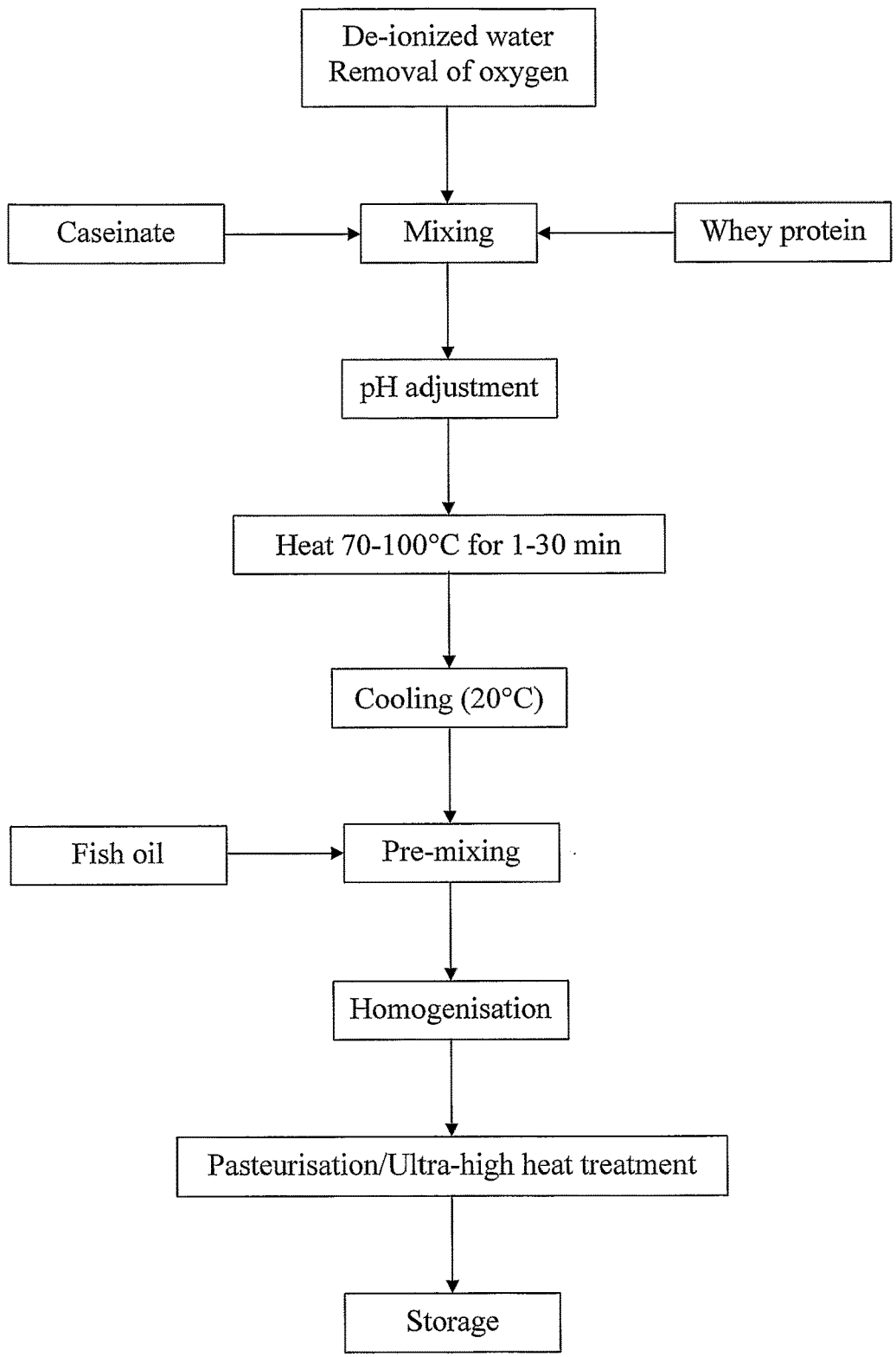
FIG. 1 is a flow diagram showing a preferred embodiment of the method of the invention.

The term "lipid" as used herein means a substance that is soluble in organic solvents and includes, but is not limited to, oils, fats, triglycerides, fatty acids and phospholipids.

The term "emulsion" as used herein means a composition comprising two immiscible liquid phases wherein one of the liquid phases is dispersed in the other in the form of small droplets.

The term "polyunsaturated fatty acid or ester thereof" as used herein means a fatty acid with two or more carbon-carbon double bonds in its hydrocarbon chain or the ester of such an acid.

The term "highly unsaturated fatty acid or ester thereof" as used herein means a polyunsaturated fatty acid having at least 18 carbon atoms and at least 3 double bonds or the ester of such an acid.

The term "fish oil" as used herein means oil or fat extracted from an animal living in water including but not limited to fish. Examples include, but are not limited to, oil or fat extracted from tuna, herring, mackerel, sardine, salmon, cod liver, anchovy, halibut and shark and combinations thereof.

The term "omega-3 fatty acid" as used herein means a polyunsaturated fatty acid whose first double bond occurs at the third carbon-carbon bond from the end opposite the acid group.

The term "comprising" as used in this specification means "consisting at least in part". That is to say when interpreting statements in this specification which include that term, the features prefaced by that term in each statement all need to be present but other features can also be present.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In a first aspect the invention provides an emulsion comprising at least one oxidisable lipid encapsulated in a complex of casein and whey protein. Preferably the complex comprises casein and whey proteins which are cross-linked to some degree or otherwise covalently bonded.

Encapsulation of the oxidisable lipid by the complex stabilizes the oxidisable lipid, decreasing its rate of oxidation. It also masks the smell and taste of the lipid making it more palatable to consumers. The resulting product has the advantage that it is heat stable which allows it to be heat-treated or sterilised.

The complex is preferably made by heating an aqueous solution of casein and whey protein.

Without wishing to be bound by theory, it is believed that this process causes unfolding of whey proteins which releases the sulfhydryl groups of the respective proteins, allowing them to form intermolecular disulfide bond linkages with caseins. Excess sulfhydryl groups present in the whey proteins remain in their reduced state. These free sulfhydryl group confer additional antioxidant activity on the complex.

Preferably encapsulation of the oxidisable lipid by the complex is achieved by homogenisation of the mixture of the protein complex and the lipid. This results in the formation of microparticles of oxidisable lipid, with an average diameter of 0.4±0.5 μm, which are encapsulated in the protein complex. The protein complex, which is adsorbed at the oil-water interface, greatly improves the stability of emulsions and protects the oxidisable lipid from exposure to oxidants and pro-oxidants. Pro-oxidants, such as metal ions, are able to lower the activation energy for the initiation of lipid oxidation. Some of these metal ions are bound by the protein complexes, which reduces their negative impact on lipid oxidation.

The casein for use in the invention may be any casein protein including but not limited to α-casein, κ-casein, β-casein and δ-casein, and their salts and mixtures thereof. Preferably, the casein is sodium caseinate.

The whey protein for use in the invention may be any milk serum protein or protein composition including but not limited to whey protein isolate, whey protein concentrate, α-lactalbumin and β-lacoglobulin. Preferably the whey protein is WPI.

The oxidisable lipid may be any lipid that is at least partially oxidised by exposure to atmospheric oxygen. The oxidisable lipid may be any lipid of use in the food, pharmaceutical or cosmetic industries and is preferably an edible lipid. The oxidisable lipid may be extracted from a marine animal, plant, phytoplankton or algae including microalgae, or any other appropriate source. Alternatively, it may be produced synthetically. The oxidisable lipid may be used in non-purified, purified or highly purified form, concentrated or non-concentrated.

Oxidisable lipids suitable for use in the invention include but are not limited to plant oils such as canola oil, borage oil, evening primrose oil, safflower oil, sunflower oil, flaxseed oil, wheat germ oil, algal oil, grapeseed oil; oxygen sensitive fats; omega-3 fatty acid precursors such as α-linolenic acid; and fish oils obtained from fish such as tuna, herring, mackerel, sardine, salmon, cod liver, anchovies, halibut and shark.

Preferred oxidisable lipids are the polyunsaturated fatty acids and esters thereof, in particular, highly unsaturated fatty acids or esters thereof. Preferably, the emulsion of the invention contains at least about 10% polyunsaturated fatty acid or ester. Particularly preferred are highly unsaturated fatty acids such as omega-3 and omega-6 fatty acids and oils containing them, for example EPA and DHA.

The oxidative stability of the emulsions of the invention can be measured using any assay known in the art, for example the peroxide value (Association of Official Analytical Chemists, International; Official Method CD 8-53) or TBARS assay (Inou, T., Ando, K. and Kikugawa, K. 1998. Journal of the American Oil Chemists' Society, 75, 597-600). Another technique for analysing the oxidative stability of a composition is by measuring the propanal formation. Propanal is a major oxidative product of omega-3 fatty acids and is though to be the main source of off-odours produced when the lipid is oxidised. Volatile analysis of propanal formation can therefore be used to gauge oxidative stability (D Djordjevic, D J McClements and E A Decker, *Journal of Food Science* 2004, Vol. 69 Nr. 5, 356-362.; H Lee et al. *Journal of Food Science* 2003, Vol. 68 Nr. 7 2169-2177; Augustin Mary Ann and Sanguansri, Luz. United States Patent Application 20030185960).

FIG. 1 shows a preferred embodiment of the method of the invention. As shown in the diagram, the emulsion is made by first mixing equal amounts (by weight) of casein and whey protein in water to form an aqueous solution. Although a 1:1 ratio of the protein components is preferred, other ratios can be used in the method of the invention.

In another embodiment the emulsion comprises at least about 0.25 wt % casein. Preferably, the emulsion comprises about 0.25 to about 5 wt % casein. More preferably, the emulsion comprises about 1 to about 4 wt % casein, most preferably, about 2 to about 3 wt % casein.

In another embodiment the emulsion comprises at least about 0.25 wt % whey protein. Preferably, the emulsion comprises about 0.25 to about 5 wt % whey protein. More preferably, the emulsion comprises about 1 to about 4 wt % whey protein, most preferably, about 2 to about 3 wt % whey protein.

Preferably, the total protein concentration is about 0.5 to about 10%. More preferably, the total protein concentration is about 2 to about 8%. In a preferred embodiment, the total protein concentration is 4%. Emulsions with differing protein concentration may be useful in different application. High protein concentration emulsions (e.g. 10% protein) may be viscous and difficult to handle. Protein is an expensive component therefore high stable emulsions of low protein concentration are economically advantageous.

Optionally, the water can first have been de-ionised and the oxygen removed using techniques known in the art.

In this embodiment the pH of the mixture is then adjusted to about 6 to about 9. Preferably, the pH is adjusted to about 6.5 to about 8, more preferably to about 7.5 to about 8. The pH can be adjusted using any aqueous base such as NaOH solution, and an aqueous acid such as HCl solution.

In this embodiment the mixture is then heated to about 70° C. to about 100° C. for 1 to 30 minutes. Preferably, the mixture is heated to about 75° C. to about 95° C., more preferably to about 90° C. Preferably the mixture is heated for 5 minutes. Heating causes unfolding of the proteins and thus exposes their sulfhydryl groups. It is believed that the sulfhydryl groups undergo sulfhydryl-disulphide interchange reactions to form intermolecular bonds, to make a complex of the two types of proteins.

The oxidisable lipid, in this case fish oil, is then mixed in with the complex. The mixture is homogenised to form an emulsion of the invention. The homogenisation step can be performed by any conventional emulsifying process known in the art. For example, the oxidisable lipid may be added to the aqueous phase under high-shear mixing to prepare a pre-emulsion. The pre-emulsion can then be subjected to high pressure homogenisation. When homogenised with the oil, the disulphide-linked complex forms thicker, more stable interfacial layers. This provides greater encapsulation and better heat stability to the emulsion, as compared with emulsions made with a single protein or uncomplexed mixtures of proteins.

Optionally, the emulsion may be heat treated or sterilised. For example, the emulsion can be subjected to ultra-high heat treatment (e.g., 140° C. for 5 seconds) or pasteurised (e.g., 72° C. for 15 seconds). The emulsion can also be retorted (e.g. heated in a sealed container at 120° for 20 minutes). The emulsion can also be dried by any method known in the art to form a powder containing encapsulated oxidisable lipids. Methods of drying the emulsion include, but are not limited to, spray-drying.

The emulsion of the invention may also comprise additives such as flavouring agents, nutrients, vitamins, stabilisers, preservatives, antioxidants, sweeteners, colouring agents, masking agents, sugars, buffers, disintegrating agents, suspending agents, solubilising agents, emulsifiers, enhancers and the like.

Foods containing oxidisable lipids such as omega-3 fatty acids are considered to be high value, functional foods. The emulsions and powders made in accordance with this invention are suitable as ingredients for use in a variety of foodstuffs including but not limited to milk and milk based products, dips, spreads, sauces, pastes, yoghurts, condiments, dressings, beverages, pasta products, bread and bakery products, meat and fish products, infant foods, processed cheese, natural cheese, vegetable juice, fruit juice, sausage, pate, candy, mayonnaise, dressing, soy bean sauce, soy bean paste. They may also used as an alternative source or partial replacement of oils and fats in ice cream, dairy dessert, creamers, soup bases, filled dairy products, snack foods and nutrition and sports bars.

The emulsion of the invention has the advantage that it is heat stable which allows it to be sterilised. This is of great benefit as it allows the encapsulated lipid to be added to foods and nutriceutical products that must be sterilized before consumption, for example infant formula and UHT drinks.

The emulsion of the invention can also be used in other fields, such as to encapsulate oil-soluble flavours, antioxidants and other bioactives for medical uses. For example, nutriceuticals such as cod liver oil, mineral oil, oil-soluble vitamins and drugs delivered in an oil base can all be incorporated into the emulsion of the invention. In particular, the emulsion of the invention can be used to deliver vitamin A (retinol), vitamin D (calciferol), vitamin E, tocopherols, tocotrienols, vitamin K (quinone), beta-carotene (pro-vitamin-A) and combinations thereof.

The emulsions of the invention can also be used in the production of cosmetics such as moisturiser, skin cream, hand cream, face cream, massage cream or make-up.

The emulsion of the invention provides a convenient and cost effective means for stabilizing oxidisable lipids, such as fish oils. Encapsulation in a protein complex reduces the rate of oxidation of the oxidisable lipid and ensures that any offensive smell and/or taste is masked making it more palatable to consumers.

Apart from shielding the oxidisable lipid from oxidants and pro-oxidants, the exposed sulfhydryl groups may have antioxidant activity themselves. Therefore, the inherent antioxidant properties of the emulsion of the invention also assist in preventing the oxidisable lipids from spoiling. Additionally, casein and whey proteins are known to bind metal ions such as the ions of Fe and Cu. These ions are thought to be catalysts for the induction of lipid oxidation.

The inherent antioxidant activity of the emulsions of the invention may reduce or eliminate the need for additional antioxidant compounds to be added to the emulsion or products made from the emulsion. This is advantageous because many compounds successfully used as antioxidants in bulk oils can demonstrate pro-oxidant activity in complex food systems.

The emulsion of the invention is resistant to oxidation, stable to heat treatments, e.g. pasteurisation and UHT, has a long shelf-life, and has an improved flavour and taste.

Various aspects of the invention will now be illustrated in non-limiting ways by reference to the following examples Example 1

To make 1 kg of emulsion, 20 g of whey protein isolate and 20 g of sodium caseinate (both supplied by Fonterra Co-operative Ltd, New Zealand) were dissolved in 660 g de-ionised water at 40° C. for 30 min with continuous stirring. The de-ionised water was produced by passing water through 0.22 μm membrane filter under vacuum to remove oxygen. The pH of the protein solution was adjusted to 7.5 using 1M NaOH. The protein solution was rapidly heated to 90° C. in an ultra-high temperature (UHT) pilot plant (Alpha Laval, Sweden), held at that temperature for 10 min and then immediately cooled to 20° C. in an ice bath. The protein solution (700 g) was mixed with 300 g Tuna oil (ROPUFA '30' n-3 food oil, Roche Vitamins (UK) Ltd) and the mixture homogenised in a two-stage homogeniser (AVP 2000, Demark) with a first stage pressure of 250 bar and a second stage pressure of 40 bar. The emulsion was homogenised twice for more effective mixing of the oil phase. The emulsion was then pasteurized at 72° C. for 15 s using a UHT plant.

The process is shown schematically in FIG. 1.

Example 2

The oxidation rates of eight protein-containing emulsions (A-D and F-G) were compared with the emulsion of the invention (E) over a four day period. The composition of the emulsions is shown below.
  A: 2% sodium caseinate
  B: 4% sodium caseinate
  C: 2% WPI
  D: 4% WPI
  E: emulsion of the invention (2% WPI and 2% sodium caseinate)
  F: 2% sodium caseinate+2% glucose heated 90° C. for 30 min
  G: 4% sodium caseinate+4% glucose heated 90° C. for 30 min
  H: 2% WPI+2% glucose heated 90° C. for 30 min
  I: 4% WPI+4% glucose heated 90° C. for 30 min
  Emulsions A to D were prepared based on the paper published by D Djordjevic, D J McClements and E A Decker, *Journal of Food Science* 2004, Vol. 69 No. 5, 356-362 which forms the basis of U.S. Pat. No. 6,444,242. Emulsion E was prepared according to Example 1. Emulsions F to I were prepared from the teachings of US Patent Application No. 20030185960.

Figure 2:
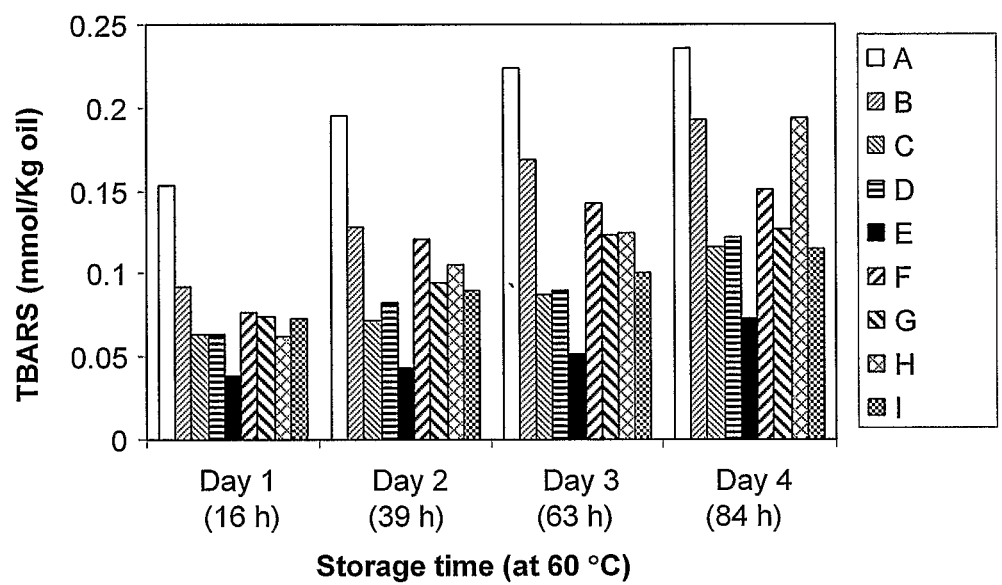
FIG. 2 is a graph showing the lipid oxidation rates of protein-based emulsions including a preferred embodiment of the invention (measured as the concentration of thiobarbituric acid reactive substances (TBARS)) over a four day period during incubation at 60° C.

All of the emulsions contained 30% fish oil. The emulsions were incubated at 60° C. and tested at 16, 39, 63 and 84 hours. The results are shown in FIG. 2. The extent of oxidation was measured using the thiobarbituric acid reactive substances (TBARs) assay which measures the concentration of malonaldehyde (MDA) under acidic conditions in mmol/kg oil.

As can be seen from FIG. 2, emulsion E showed a significantly lower rate of oxidation than comparative protein-based emulsions.

Example 3

Emulsions A to I as defined in Example 2 were investigated for oxidative stability and formation of volatile off-flavour by determining the formation of propanal, one of the by products of oxidation of omega-3 fatty acids (D Djordjevic, D J McClements and E A Decker, *Journal of Food Science* 2004, Vol. 69 Nr. 5, 356-362.; H Lee et al. *Journal of Food Science* 2003, Vol. 68 Nr. 7 2169-2177; Augustin Mary Ann and Sanguansri, Luz. United States Patent Application 20030185960).

Each emulsion (3 g) was sealed in a glass vial (20 ml), then the sample was incubated at 50° C. followed by solid-phase microextraction (SPME) using the SPME fibre (Supelco 75 μm Carboxen-PDMS) for 20 minutes. The sample was then analysed using a Shimatzu AOC-5000 auto sampler and Shimatzu GC-2010 gas chromatograph fitted with Supelcowax 10 fused capilliary column (30 m, 0.32 i.d., 0.5 μm film) and FID detector. The analysis was carried out at least twice on each sample. The propanal concentrations were determined from peak areas using a standard curve made from authentic propanal.

Figure 3:
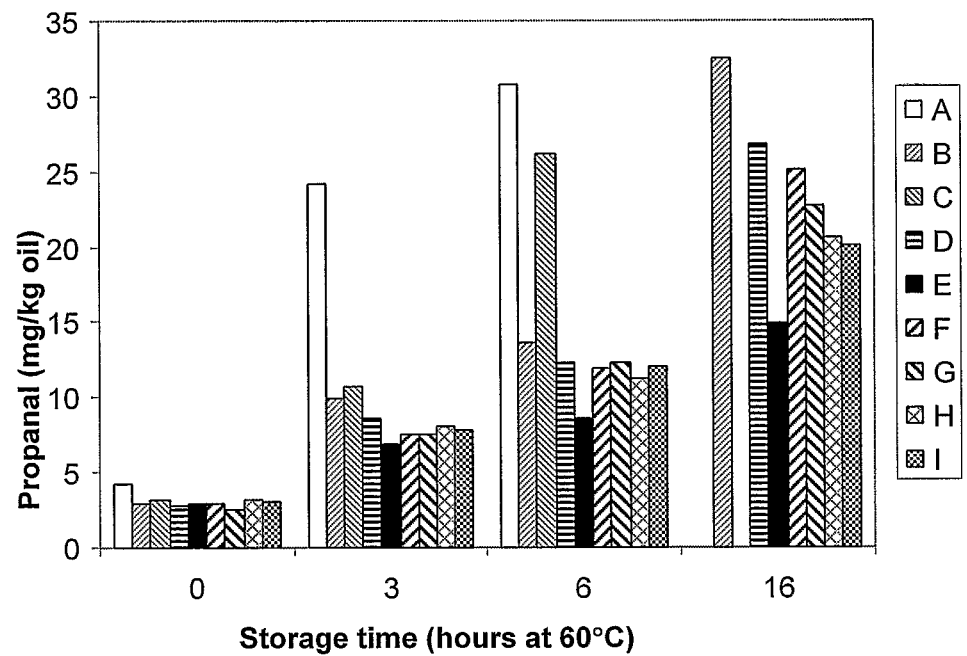
FIG. 3 is a graph showing the lipid oxidation rates of protein emulsions including a preferred embodiment of the invention (measured as the concentration of headspace propanal extracted by SPME) over a 16 hour period during incubation at 60° C.

As can be seen in FIG. 3, emulsion E showed a significantly lower rate of oxidation than the comparative protein-based emulsions.

Example 4

Emulsions of the invention (Table 1) were prepared using protein complexes of various concentrations to determine the effect of total protein concentration on the extent of lipid oxidation.

Emulsions were prepared substantially as described in Example 1, except that the protein mixture solutions were adjusted to pH 6.7, and heated to 90° C. for 5 minutes, prior to emulsification.

TABLE 1

| Emulsion | sodium caseinate conc. (wt %) | whey protein isolate conc. (wt %) | total protein conc. (wt %) |
|---|---|---|---|
| a | 0.25 | 0.25 | 0.5 |
| b | 0.5 | 0.5 | 1.0 |
| c | 1.0 | 1.0 | 2.0 |
| d | 2.0 | 2.0 | 4.0 |
| e | 3.0 | 3.0 | 6.0 |
| f | 4.0 | 4.0 | 8.0 |

Figure 4A:
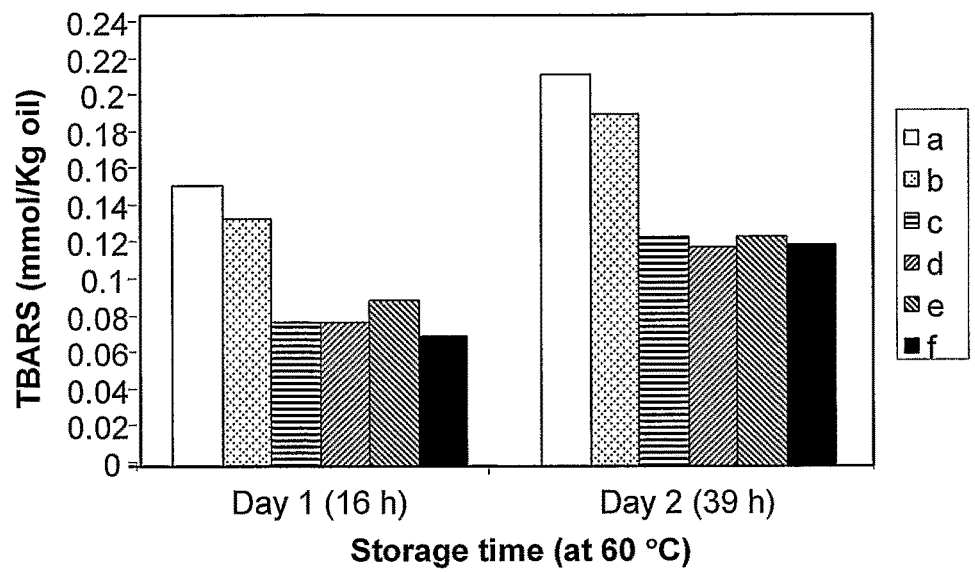
FIG. 4A shows TBARS values and FIG. 4B shows hydroperoxide values.
Figure 4B:
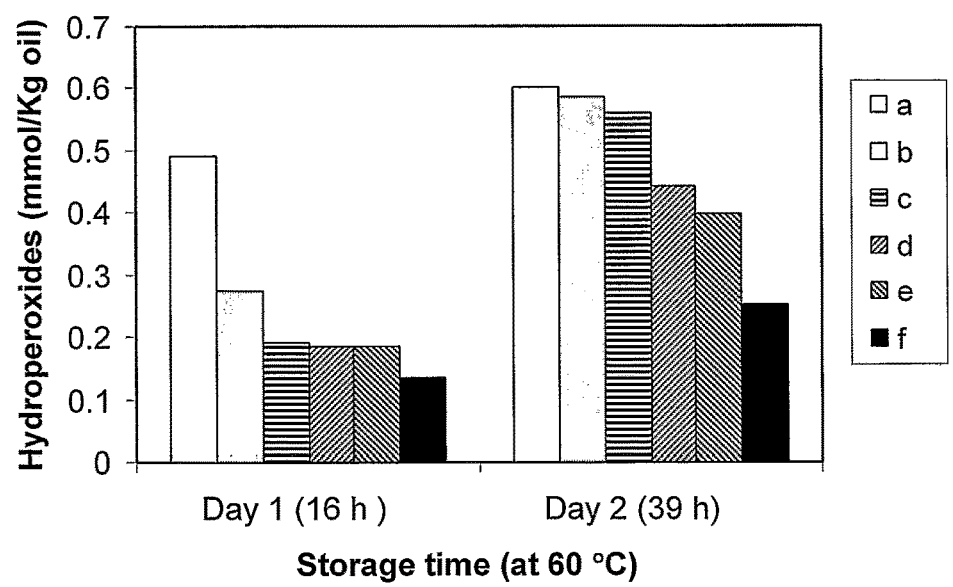

The emulsions were incubated at 60° C. and tested after 16 and 39 hours. The results are shown in FIGS. 4A and 4B. FIG. 4A shows lipid oxidation (TBARs values) and FIG. 4B shows hydroperoxide values.

Lipid oxidation was significantly decreased in emulsions with a protein concentration of over 2%.

Example 5

Emulsion d as defined in Example 4 (2% WPI+2% sodium caseinate) was tested for oxidative stability and formation of volatile off-flavours using propanal analysis against an emulsion of the invention prepared in the same way but using 5% WPI+5% sodium caseinate.

Figure 5:
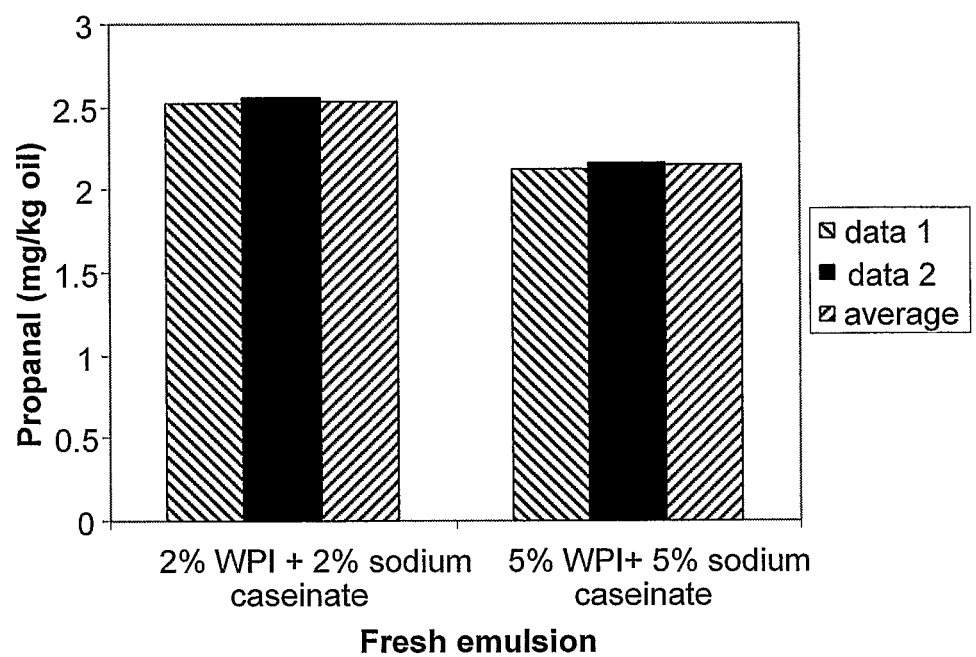
FIG. 5 is a graph showing the lipid oxidation rates of two preferred embodiments of the invention (measured by determining the formation of propanal).

The results in FIG. 5 show that oxidative stability of the emulsion is maintained even at a total protein concentration of 10%.

Example 6

Figure 6A:
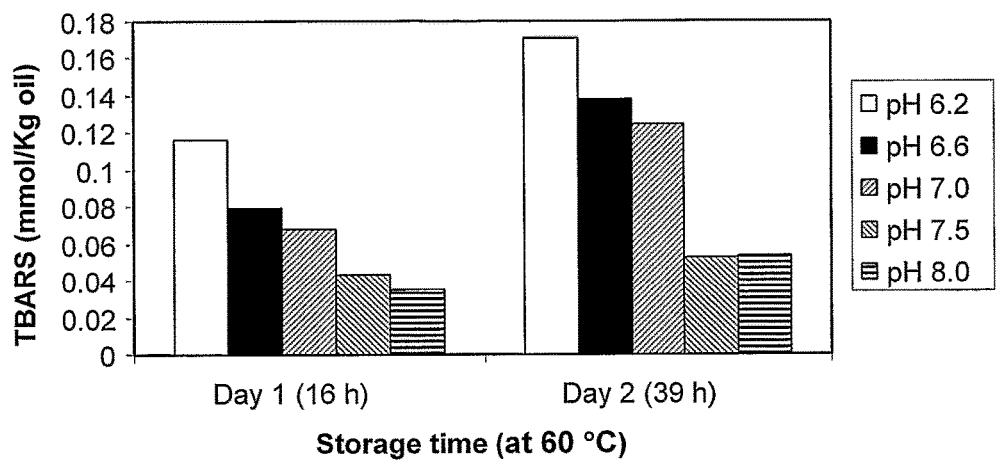
FIG. 6A shows TBARS values and FIG. 6B shows hydroperoxide values.
Figure 6B:
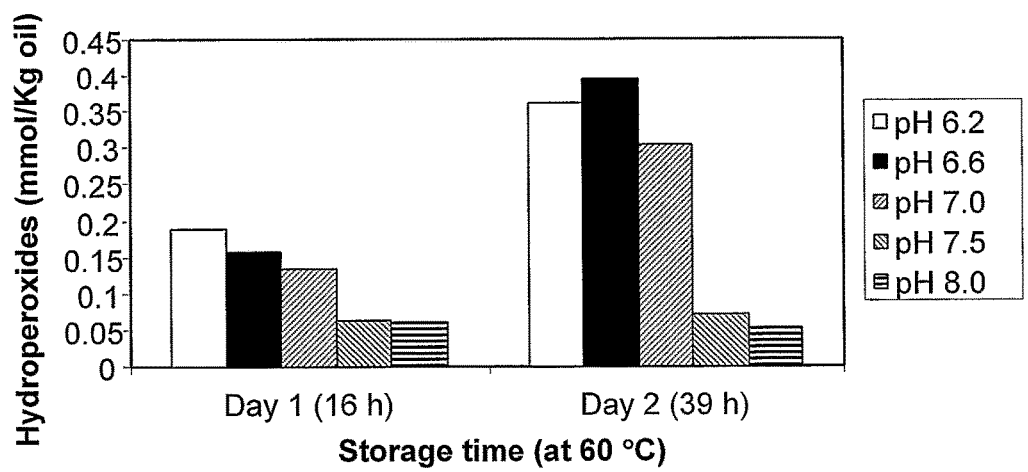

The lipid oxidation rates of emulsions of the invention prepared by heating protein solutions at different pH were determined. Emulsions were prepared as described in Example 1, except that the pH of the mixture of 2 wt % sodium caseinate solution and 2 wt % WPI solution was adjusted in the range 6.2 to 8.0 and then heated at 90° C. for 5 min. The results are shown in FIGS. 6A and 6B. FIG. 6A shows the lipid oxidation values (TBARs) while FIG. 6B shows the hydroperoxide values.

Both the TBARs and hydroperoxide value results clearly show that the pH at heating has a considerable effect on the lipid oxidation rates of the emulsion formed. The most oxidatively stable emulsions were prepared using protein solutions that had been heated at pH 7.5 or 8.0.

Example 7

The lipid oxidation rates and formation of volatile off-flavours of emulsions of the invention were determined by testing the formation of propanal in emulsions of the invention prepared by heating protein solutions at different pH.

A solution of 2% WPI and 2% sodium caseinate was adjusted to different pH values using 1M HCl or NaOH, and heated at 90° C. for 5 min. The samples were cooled to 10° C., and mixed with fish oil, and homogenised to make the final emulsion containing 30% oil.

Figure 7A:
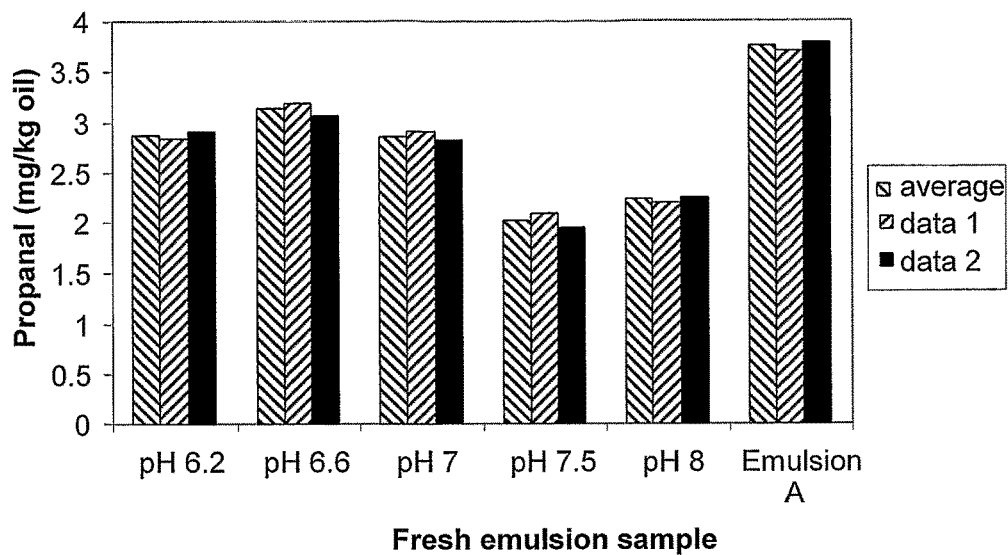
Figure 7B:
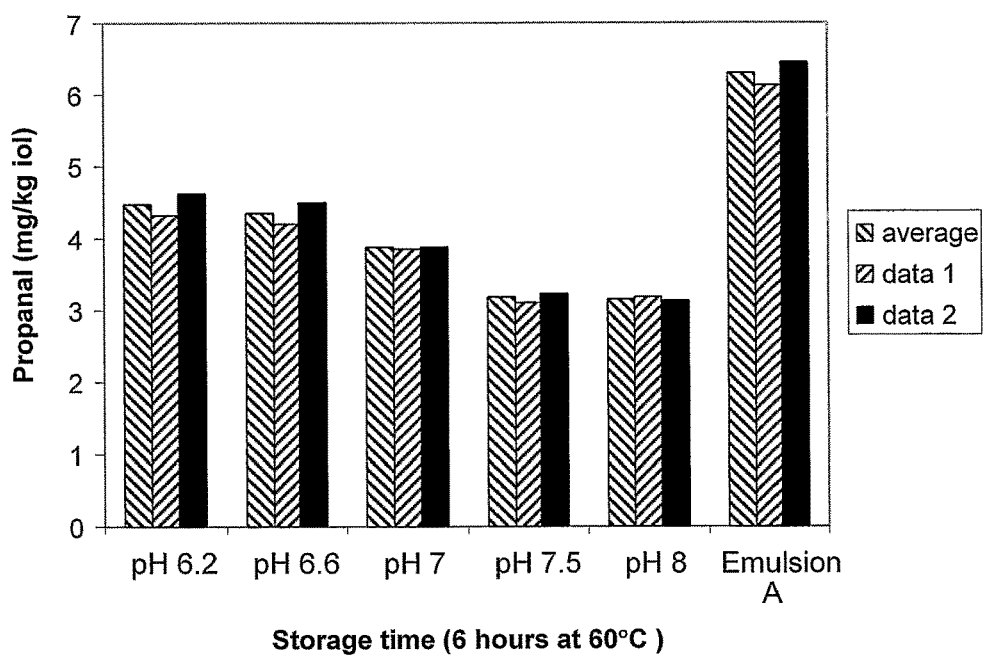
FIG. 7B shows the lipid oxidation rates of emulsions incubated for 6 hours at 60° C.

FIG. 7 shows the formation of propanal in fresh emulsions (7A) and after storage at 60° C. for 6 hours (7B). The equivalent data for Emulsion A, as defined in Example 2, is also provided.

In agreement with the hydroperoxide and TBARS results provided in Example 6, this data confirms that the most oxidatively stable emulsions are prepared using protein solutions that have been heated at approximately pH 7.5-8.0.

Example 8

Figure 8A:
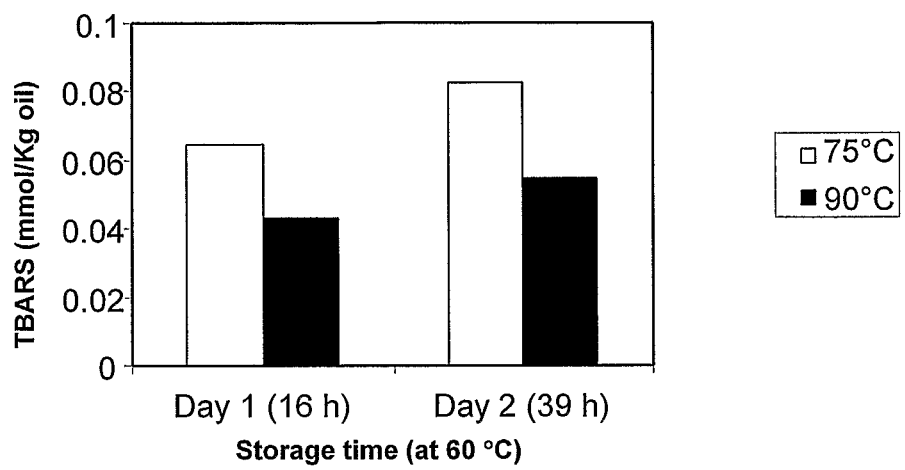
FIG. 8A shows TBARS values and FIG. 8B shows hydroperoxide values.
Figure 8B:
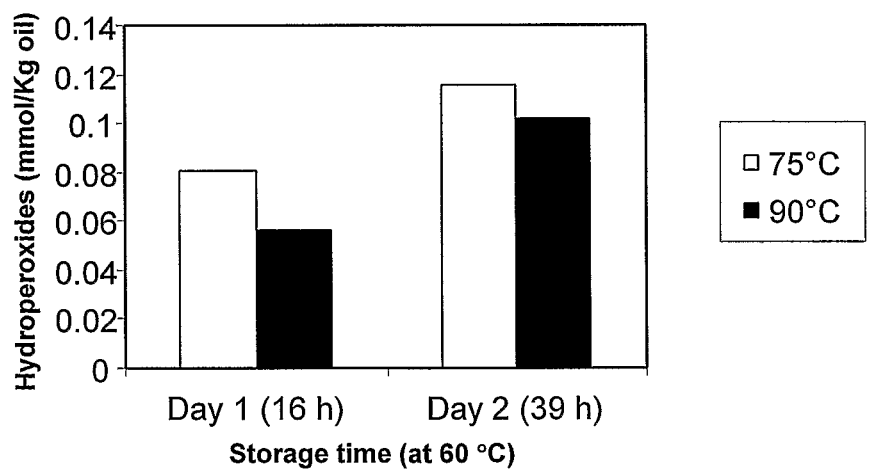

In a further experiment, emulsions of the invention prepared from protein solutions heated at two different temperatures were compared. The emulsions were both prepared from a solution of 2 wt % calcium caseinate and 2 wt % whey protein isolate heated at pH 7.5. The results are shown in FIG. 8A and FIG. 8B. FIG. 8A shows TBARs concentrations and FIG. 8B gives the hydroperoxide values.

It is clear that the lipid oxidation rate was lower in emulsions made from protein solutions heated at 90° C. as compared to those heated at 75° C.

Example 9

Different heat treatments were applied to an emulsion of the invention and their oxidative qualities assessed using propanal formation, as described in Example 3. The emulsions were subjected to (a) pasteurisation at 72° C. for 30 sec,
(b) ultra-high temperature (UHT) treatment at 140° C. for 4 sec, and
(c) retort (heat treatment in a sealed bottle) at 120° C. for 20 min.

Figure 9:
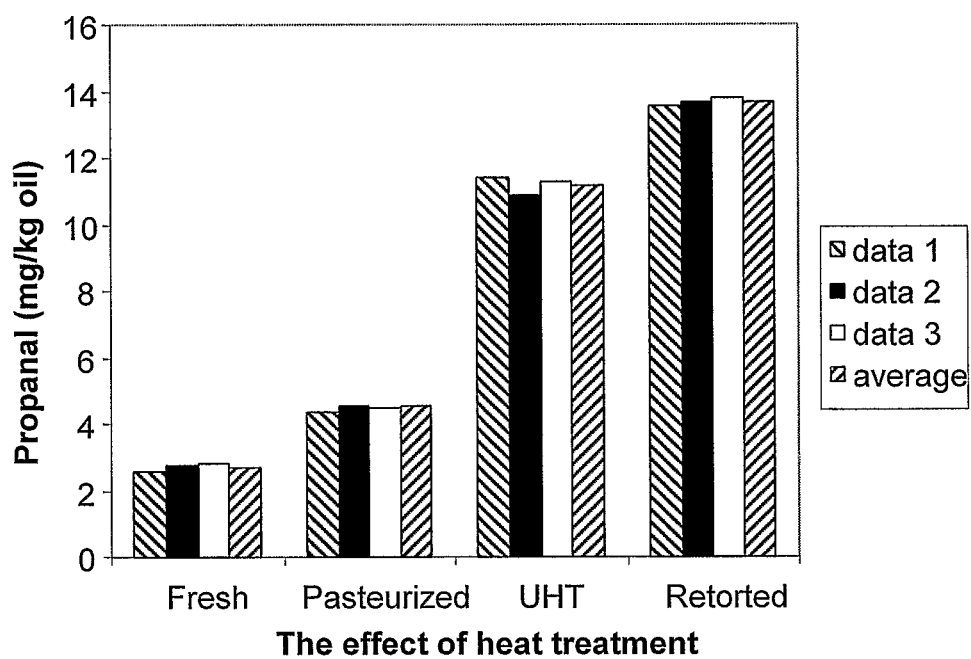
FIG. 9 is a graph showing the lipid oxidation rate of a preferred embodiment of the invention before and after heat treatment (measured by determining the formation of propanal).

The resulting propanal concentrations were compared to those of a fresh sample. The results are shown in FIG. 9. Heat treatment slightly increases the oxidation rates of the emulsion but the propanal formation is not great compared to that of untreated known fish oil emulsions. See for example, FIG. 3.

Example 10

Emulsion d, as described in Example 4 was mixed with corn syrup solution to form a composition comprising 12% fish oil and 18% corn syrup. The mixture emulsion was dried using a laboratory spray dryer with a twin fluid nozzle at 2 bar atomising pressure. The inlet and outlet air temperature for drying were 180° C. and 80° C. respectively.

Figure 10:
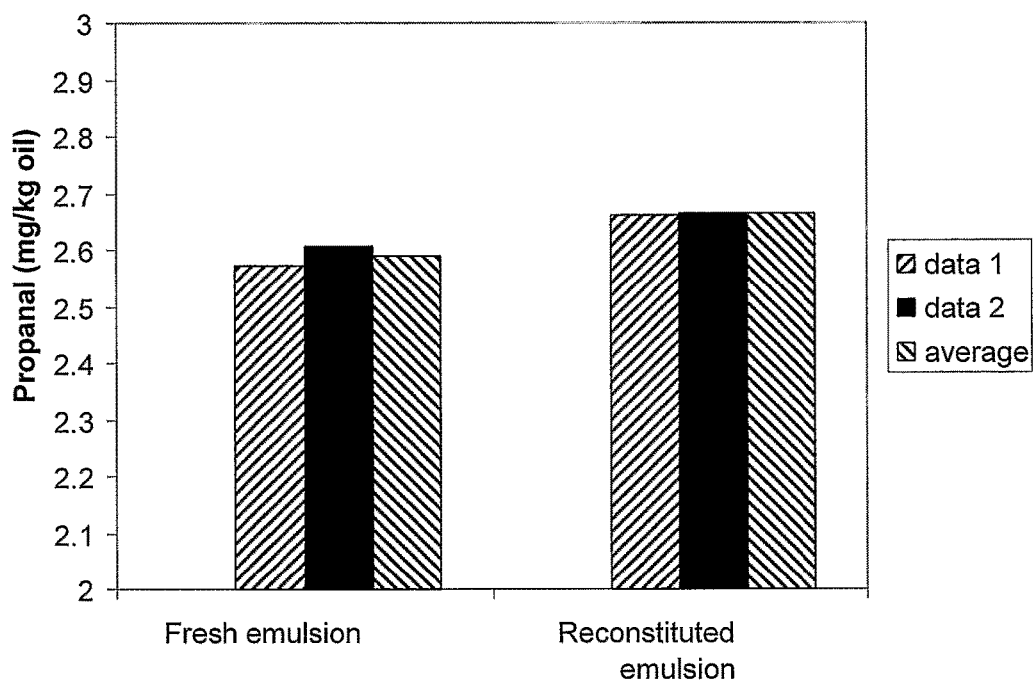
FIG. 10 is a graph showing the lipid oxidation rate of a preferred emulsion of the invention following drying and reconstitution (measured by determining the formation of propanal).

The dried powder (containing 40% fish oil) was reconstituted in water to give an emulsion of 10% fish oil. The oxidative stability of the reconstituted emulsion was compared to that of a fresh emulsion d using propanal analysis, as described in Example 3. This is shown in FIG. 10.

The reconstituted emulsion did not release significantly more propanal than the fresh emulsion.

Example 11

Development of Hummus Dip Product Containing Fish Oil

The emulsions of the invention was used to prepare Hummus dips containing a high levels of omega 3 free fatty acids (FFA) namely eicosapentaenoic acid (EPA) and docosahexanoic acid (DHA). Two flavours of hummus were made—"olive and sundried tomato" and "red chili and jalapeno", as described below.

Olive and Sundried Tomato Hummus Dip

Ingredients: Chickpeas (59.13%), Olives (10%), Emulsion (13.36%), Lemon juice (8.79%), Sundried Tomatoes (5%), Tahini (2.53%), Garlic (0.84%), Salt (0.06%), Pepper (0.18%), Citric acid (0.09%), Potassium Sorbate (0.02%).

Red Chili and Jalapeno Hummus Dip

Ingredients: Chickpeas (66.29%), Emulsion (13.36%), Lemon Juice (8.18%), Red Chilies (3%), Jalapenos (2.5%), Water (2.5%), Tahini (2.83%), Garlic (0.94%), Salt (0.08%), Pepper (0.2%), Citric acid (0.1%), Potassium Sorbate (0.02%).

Figure 11:
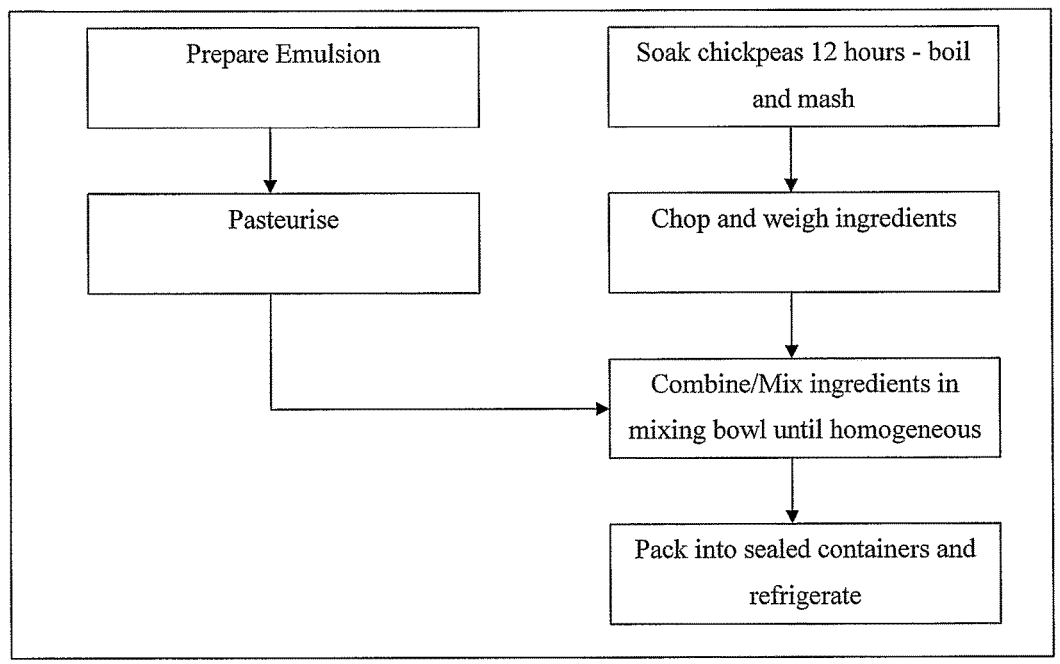
FIG. 11 is a flow diagram showing a process of preparation of a hummus dip from an emulsion of the invention.

The emulsion (made using the process described in Example 1) was added to the hummus dip at a level of 13.3%, equating to 4% fish oil, following the process shown in FIG. 11.

The emulsion was first pasteurised then combined with the other ingredients until homogenous. After being packaged into sealed containers, the hummus dip was refrigerated.

The hummus dip was found to be stable for 1 month under refrigerated conditions. Fatty acid compositional analysis was conducted on the hummus dip by the University of Newcastle in Australia and was found to contain the following:

| Olive and sundried tomato hummus dip | | Red chilli and jalapeno hummus dip | |
| --- | --- | --- | --- |
| FFA | mg per 100 g | FFA | mg per 100 g |
| EPA | 5456 | EPA | 530.0 |
| DHA | 595.8 | DHA | 585.1 |
| Total EPA + DHA | 1141.4 | Total EPA + DHA | 1115.1 |
| Total Omega 3 | 1395.8 | Total Omega 3 | 1278.9 |

Both hummus dips contained substantial amounts of EPA and DHA while having no detectable fishy odours.

It should be noted that the invention can be carried out with numerous modifications and variations and that the above Examples are by way of illustration only. For example the invention may be carried out using other proportions of casein and whey protein.

INDUSTRIAL APPLICATION

The emulsions of the present invention have utility in the food industry. They can be used to protect oxidisable lipids such as omega-3 fatty acids from oxidative damage.

The emulsions of the present invention can be incorporated into food products and/or cosmetics, preventing or reducing oxidation of the oxidisable lipid, thereby increasing product shelf life.

Those skilled in the art will understand that the above description is provided by way of illustration only and that the invention is not limited thereto.

What we claim is:

1. An emulsion comprising at least one oxidisable lipid encapsulated in a complex of casein and whey protein, wherein the whey protein comprises whey protein isolate or whey protein concentrate, and wherein the complex is produced by heating a solution of casein and the whey protein at about 80° C. to about 100° C. for about 1 to 30 minutes; and
    wherein the at least one oxidisable lipid is fish oil or a fish oil derivative; and wherein the emulsion comprises about 1-5 wt % whey protein and about 1-5 wt % casein; and
    wherein heating the solution of casein and whey protein at about 80° C. to about 100° C. for about 1 to 30 minutes produces synergy between the casein and whey protein concentrate resulting in greater oxidative stability of the emulsion and decreased propanol production relative to an emulsion having a complex produced without heat treatment of a solution of casein and whey protein.

2. An emulsion according to claim 1 comprising about 20 to about 30 wt % of the at least one oxidisable lipid.

3. An emulsion according to claim 1, wherein the oxidisable lipid is an omega-3 fatty acid.

4. An emulsion according to claim 3 wherein the omega-3 fatty acid is docosahexaenioc acid or eicosapentaenoic acid.

5. An emulsion according to claim 1 wherein the weight ratio of casein to whey protein in the emulsion is about 2:1 to about 1:2.

6. An emulsion according to claim 1 wherein the casein is sodium caseinate.

7. An emulsion according to claim 1 wherein the whey protein is whey protein isolate (WPI) or whey protein concentrate (WPC).

8. An emulsion according to claim 1 which comprises about 2 to 4 wt % casein and about 2 to 4 wt % whey protein.

9. A method of making an emulsion comprising at least one oxidisable lipid encapsulated by a complex of casein and whey protein, the emulsion comprising about 1-5 wt % casein and about 1-5 wt % whey protein, wherein the whey protein comprises whey protein isolate or whey protein concentrate, and wherein the at least one oxidisable lipid is fish oil or a fish oil derivative; the method comprising:
- (a) heating an aqueous solution of casein and whey protein at about 80° C. to 100° C. for 1 to 30 minutes to form a protein complex;
- (b) dispersing the at least one oxidisable lipid in the aqueous solution, and
- (c) homogenising the mixture formed in step (b) to form an emulsion with microparticles of the at least one oxidizable lipid encapsulated in the protein complex;
    wherein heating the solution of casein and whey protein at about 80° C. to about 100° C. for about 1 to 30 minutes produces synergy between the casein and whey protein concentrate resulting in greater oxidative stability of the emulsion and decreased propanol production relative to an emulsion having a complex produced without heat treatment of a solution of casein and whey protein.

10. A method according to claim 9 wherein the aqueous solution of casein and whey protein has a pH in the range of about 6 to about 9.

11. A method according to claim 9 wherein the at least one oxidisable lipid is fish oil.

12. A method according to claim 9 wherein the oxidisable lipid is an omega-3 fatty acid.

13. A method according to claim 9 wherein the ratio of casein to whey protein is about 2:1 to about 1:2.

14. A method according to claim 9 wherein the casein is sodium caseinate.

15. A method according to claim 9 wherein the whey protein is whey protein isolate (WPI) or whey protein concentrate (WPC).

16. A method according to claim 9 wherein the casein and whey protein in the protein complex are linked by disulfide bonds.

17. A method according to claim 9, wherein the method comprises heating the aqueous solution of casein and whey protein for about 5 to 30 minutes.

18. An emulsion according to claim 1 wherein the solution of the casein and whey protein is heated for about 5 to 30 minutes.

19. The emulsion according to claim 1, wherein the emulsion achieves a decreased lipid oxidation rate and decreased formation of volatile off-flavor relative to an emulsion having a complex produced without heat treatment of a solution of casein and whey protein.

20. The method according to claim 9, wherein the emulsion achieves a decreased lipid oxidation rate and decreased formation of volatile off-flavor relative to an emulsion having a complex produced without heat treatment of a solution of casein and whey protein.

21. The emulsion according to claim 1, comprising microparticles of the at least one oxidisable lipid, with an average diameter of 0.4.+−.0.5 .mu.m, which are encapsulated in the protein complex.

22. The method according to claim 9, wherein the microparticles have an average diameter of 0.4.+−.0.5 .mu.m.

23. The method according to claim 9, further comprising spray drying the emulsion.

24. The method according to claim 9, further comprising deodorizing the emulsion with nitrogen.

25. The emulsion according to claim 1, wherein the casein and whey proteins are cross-linked or covalently bonded.

26. The emulsion according to claim 1, wherein the aqueous solution of casein and whey protein has a pH in the range of about 7.5 to about 8.

27. The method according to claim 10, wherein the aqueous solution of casein and whey protein is adjusted to have a pH is the range of about 7.5 to about 8.

28. The method according to claim 9, wherein the water is de-ionized and oxygen is removed.

29. The method according to claim 9, wherein the emulsion is homogenized in two-stages with a first stage pressure of 250 bar and a second stage pressure of 40 bar.

30. The method according to claim 29, further comprising pasteurizing the emulsion at 72° C. for 15 seconds using a UHT plant.

31. The emulsion according to claim 1, wherein the emulsion comprises a powder.

32. The method according to claim 9, further comprising drying the emulsion to form a powder.

* * * * *